United States Patent
Yoshimoto

(10) Patent No.: US 11,762,615 B2
(45) Date of Patent: Sep. 19, 2023

(54) PRINTING SYSTEM AND CONTROL METHOD OF PRINTING SYSTEM

(71) Applicant: SHARP KABUSHIKI KAISHA, Sakai (JP)

(72) Inventor: Kazuhiro Yoshimoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/836,339

(22) Filed: Jun. 9, 2022

(65) Prior Publication Data
US 2022/0405034 A1 Dec. 22, 2022

(30) Foreign Application Priority Data

Jun. 18, 2021 (JP) ................................. 2021-101798

(51) Int. Cl.
*G06F 3/12* (2006.01)

(52) U.S. Cl.
CPC .......... *G06F 3/1293* (2013.01); *G06F 3/1207* (2013.01); *G06F 3/1212* (2013.01); *G06F 3/1253* (2013.01); *G06F 3/1261* (2013.01); *G06F 3/1267* (2013.01); *G06F 3/1285* (2013.01)

(58) Field of Classification Search
CPC .... G06F 3/1293; G06F 3/1207; G06F 3/1212; G06F 3/1253; G06F 3/1261; G06F 3/1267; G06F 3/1285
See application file for complete search history.

(56) References Cited

U.S. PATENT DOCUMENTS

| | | | |
|---|---|---|---|
| 2016/0011835 A1* | 1/2016 | Igarashi | G06F 3/1292 358/1.15 |
| 2016/0065781 A1* | 3/2016 | Um | H04N 1/00493 358/1.15 |
| 2017/0115936 A1* | 4/2017 | Suzuki | G06F 3/1205 |
| 2017/0257517 A1* | 9/2017 | Panda | H04N 1/00244 |
| 2018/0181352 A1* | 6/2018 | Saito | G06F 3/1288 |

FOREIGN PATENT DOCUMENTS

JP 2015-049857 A 3/2015

* cited by examiner

*Primary Examiner* — John R Wallace
(74) *Attorney, Agent, or Firm* — ScienBiziP, P.C.

(57) ABSTRACT

A printing system includes a plurality of image forming apparatuses capable of mutually communicating with a portable terminal device and a client terminal device. The client terminal device generates a print job that includes print data and job information. The portable terminal device stores job information transmitted from the client terminal device. The image forming apparatus acquires the job information from the portable terminal device, acquires the print data corresponding to the job information from the client terminal device, and execute image output the print data.

4 Claims, 5 Drawing Sheets

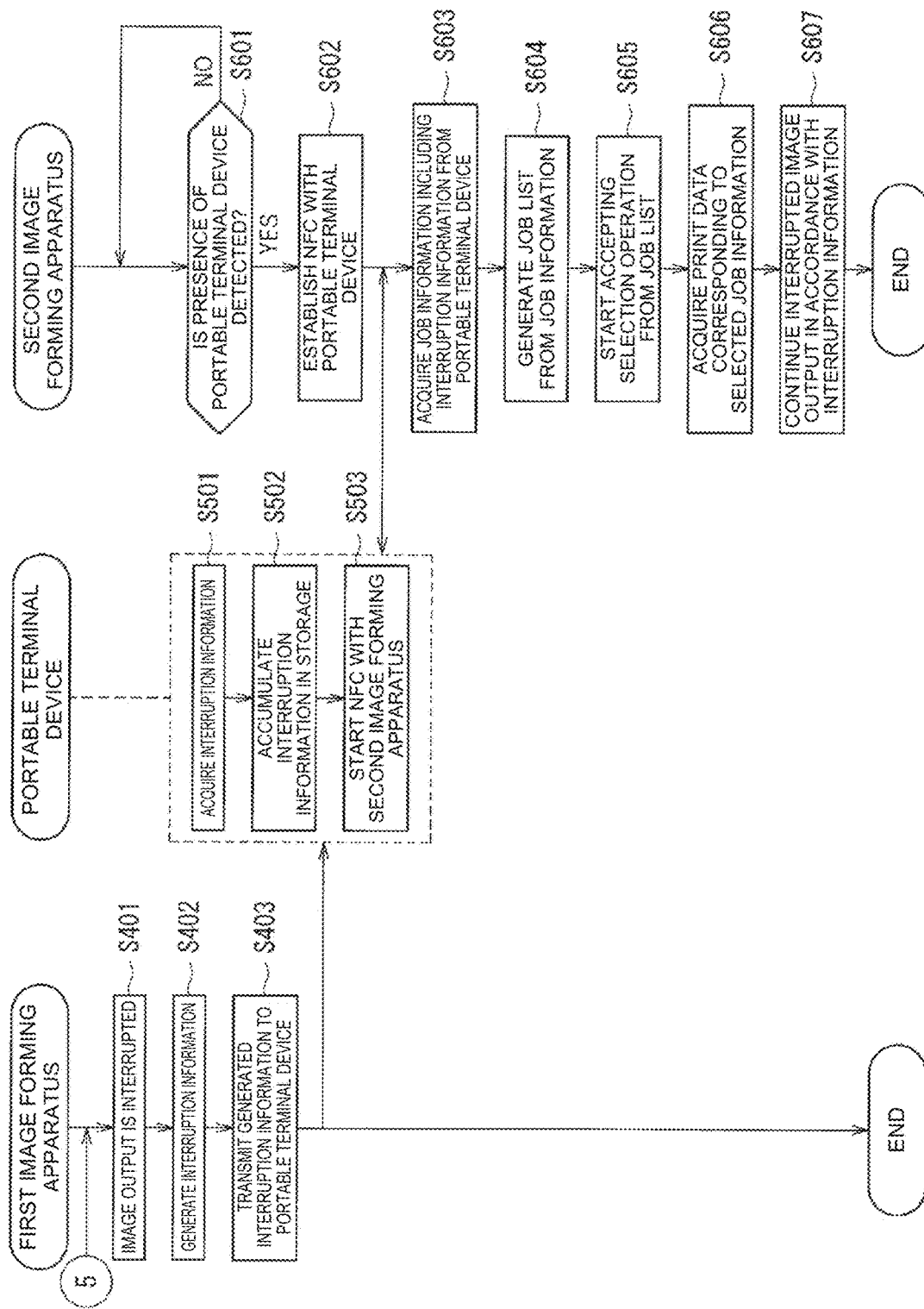

PRINTING SYSTEM AND CONTROL METHOD OF PRINTING SYSTEM

BACKGROUND OF THE INVENTION

Field of the Invention

The present disclosure relates to a printing system and a control method of a printing system in which a portable terminal device is interposed between a client terminal device and an image forming apparatus to process print jobs in the image forming apparatus.

Description of the Background Art

A multifunction machine (Multifunction Peripheral (MFP)) which is one type of the image forming apparatus has multiple functions such as copy, fax, printer, and scanner functions. A portable terminal device such as a smartphone may include a near-field reader/writer to enable near-field communication (NFC), and an image forming apparatus having a corresponding NFC tag is also known.

As the image forming apparatus of this type, Japanese Unexamined Patent Application Publication No. 2015-49857, for example, discloses receiving, from a portable terminal device, print data stored in the portable terminal device, and performing a print process of the received print data. The print data stored in the portable terminal device is acquired from a client terminal device and transmitted to an image forming apparatus detected by searching. In a case where the image output is interrupted in the image forming apparatus, the portable terminal device retransmits the print data to the image forming apparatus.

With such a prior art structure, the print data used as the object of image output should be stored in the portable terminal device. The larger the data capacity of the print data is, the harder the data capacity of the portable terminal device is strained, thus causing an increased communication volume. If the image output is interrupted, the print data should be transmitted anew to the interrupted image forming apparatus, requiring a high communication load for retransmitting the print data. In addition, after the cause of the interruption is resolved, the user needs to wait for the image output to start again at the image forming apparatus. This takes time and effort and makes the work very inefficient.

The present disclosure has been made in view of the above problems, and it is an object of the present disclosure to provide a printing system and a control method of the printing system which, in an image forming apparatus capable of mutually communicating with a portable terminal device and a client terminal device, can output images efficiently by a simple operation without straining the data capacity of the portable terminal device, while executing the rest of image output without time and effort even when, for example, the image output is interrupted.

SUMMARY OF THE INVENTION

To achieve the aforementioned object, the present disclosure provides a printing system including a portable terminal device, a client terminal device, and an image forming apparatus capable of mutually communicating with the portable terminal device and the client terminal device, the image forming apparatus processing a print job, in which the print job includes job information and print data, the portable terminal device includes a communicator capable of wireless communication with the client terminal device and the image forming apparatus, and a storage that stores the job information transmitted from the client terminal device, and the image forming apparatus acquires the print data corresponding to the job information from the client terminal device in accordance with the job information acquired from the portable terminal device, and executes image output of the print data.

More specific structure of the printing system having the above structure is described below. Specifically, it is preferable that the image forming apparatus in the printing system includes an operation display that displays an operation screen on which an input operation is allowed, a detector that detects the presence of the portable terminal device in an effective area of near-field communication, a communication establisher that establishes the near-field communication with the portable terminal device, a job information acquirer that acquires one or more job information stored in the storage of the portable terminal device, a job list generator that generates a job list in accordance with the acquired job information, a job list acceptor that displays the job list on the operation screen in a selectable manner, and accepts a selection operation of the job information from the job list, and a print data acquirer that acquires, when the job acceptor accepts the job information, the print data corresponding to the selected job information from the client terminal device, and the image forming apparatus executes the image output in accordance with the acquired print data.

In the printing system having the above structure, it is preferable that the portable terminal device is capable of near-field communication with a plurality of the image forming apparatuses, and one image forming apparatus of the plurality of the image forming apparatuses that has established the near-field communication with the portable terminal device executes the image output of the print data.

In the printing system having the above structure, it is preferable that the image forming apparatus includes an interruption information generator that generates, when the image output that has been started is interrupted, interruption information including the job information corresponding to the print data pertaining to the interrupted image output, and an interruption information communicator that transmits the interruption information, a first image forming apparatus of the plurality of the image forming apparatuses transmits the interruption information generated by the interruption information generator to the portable terminal device when the image output that has been started is interrupted at the first image forming apparatus, and a second image forming apparatus which is different from the first image forming apparatus acquires, when the second image forming apparatus detects the presence of the portable terminal device, the interruption information from the storage of the portable terminal device, generates the job list in accordance with the job information included in the interruption information, and continues the image output that has been interrupted in accordance with the job information selected from the job list.

In the printing system, it is preferable that the second image forming apparatus acquires the print data corresponding to the job information from the client terminal device in accordance with the job information selected from the job list to continue the image output.

In the printing system, the second image forming apparatus may acquire the print data corresponding to the job information from the first image forming apparatus in accordance with the job information selected from the job list to continue the image output.

A control method of the aforementioned printing system is also within the scope of the technical concept of the present disclosure. Specifically, a control method of the printing system including a portable terminal device, a client terminal device, and an image forming apparatus capable of mutually communicating with the portable terminal device and the client terminal device, the image forming apparatus processing a print job, in which the print job includes job information and print data, and the portable terminal device includes a communicator capable of near-field communication with the client terminal device and the image forming apparatus, and a storage that stores the job information transmitted from the client terminal device, the control method including causing the image forming apparatus to acquire the print data corresponding to the job information in accordance with the job information acquired from the portable terminal device and execute image output of the print data.

With the above specifics, it is possible to efficiently execute the image output in the image forming apparatus capable of mutually communicating with the portable terminal device and the client terminal device without straining the data capacity of the portable terminal device.

According to the embodiments of the present disclosure, the image output can be efficiently executed in the image forming apparatus capable of mutually communicating with the portable terminal device and the client terminal device and, when the interruption, for example, of the image output occurs, it is still possible to continue the image output in another image forming apparatus by a simple operation.

BRIEF DESCRIPTION OF THE DRAWINGS

FIG. 5 is a sequence chart illustrating an example of an process flow when the image output started in the image forming apparatus is interrupted.

DESCRIPTION OF THE PREFERRED EMBODIMENTS

A printing system and a control method for the printing system according to an embodiment of the present disclosure will be described below with reference to the accompanying drawings.

Figure 1:
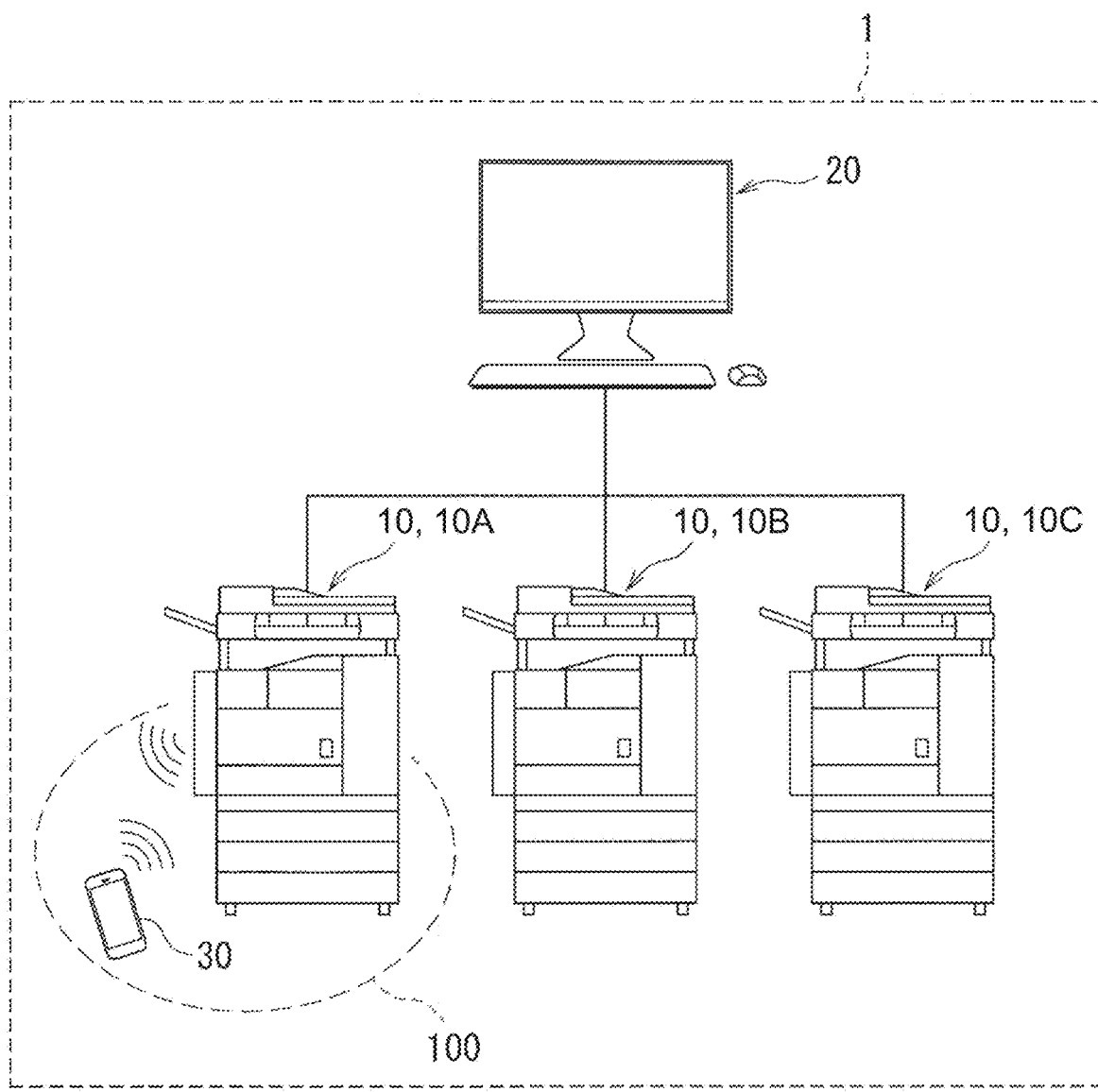
FIG. 1 is an explanatory view illustrating a schematic structure of a printing system and a control method of the printing system according to an embodiment of the present disclosure.

FIG. 1 is an explanatory view illustrating a schematic structure of a printing system 1 and a control method thereof according to the embodiment of the present disclosure. The printing system 1 according to the present embodiment includes a plurality of image forming apparatuses 10 (10A, 10B, 10C), a client terminal device 20, and a portable terminal device 30.

The image forming apparatus 10 is an MFP having multiple functions, such as copy, fax, printer, and scanner functions. The client terminal device 20 is an information processing device such as a personal computer (PC) that generates print jobs to be executed by the image forming apparatus 10. The portable terminal device 30 is, for example, a smartphone. The portable terminal device 30 may be a portable phone, a tablet device, a portable computer, or the like.

A plurality of image forming apparatuses 10 and the client terminal device 20 are communicably connected via a network such as a local area network (LAN), a wide-area network such as the Internet, or a dedicated communication line. The image forming apparatus 10 can directly communicate via the near-field communication with one portable terminal device 2 existing in an effective area 100 of the near-field communication.

Figure 2:
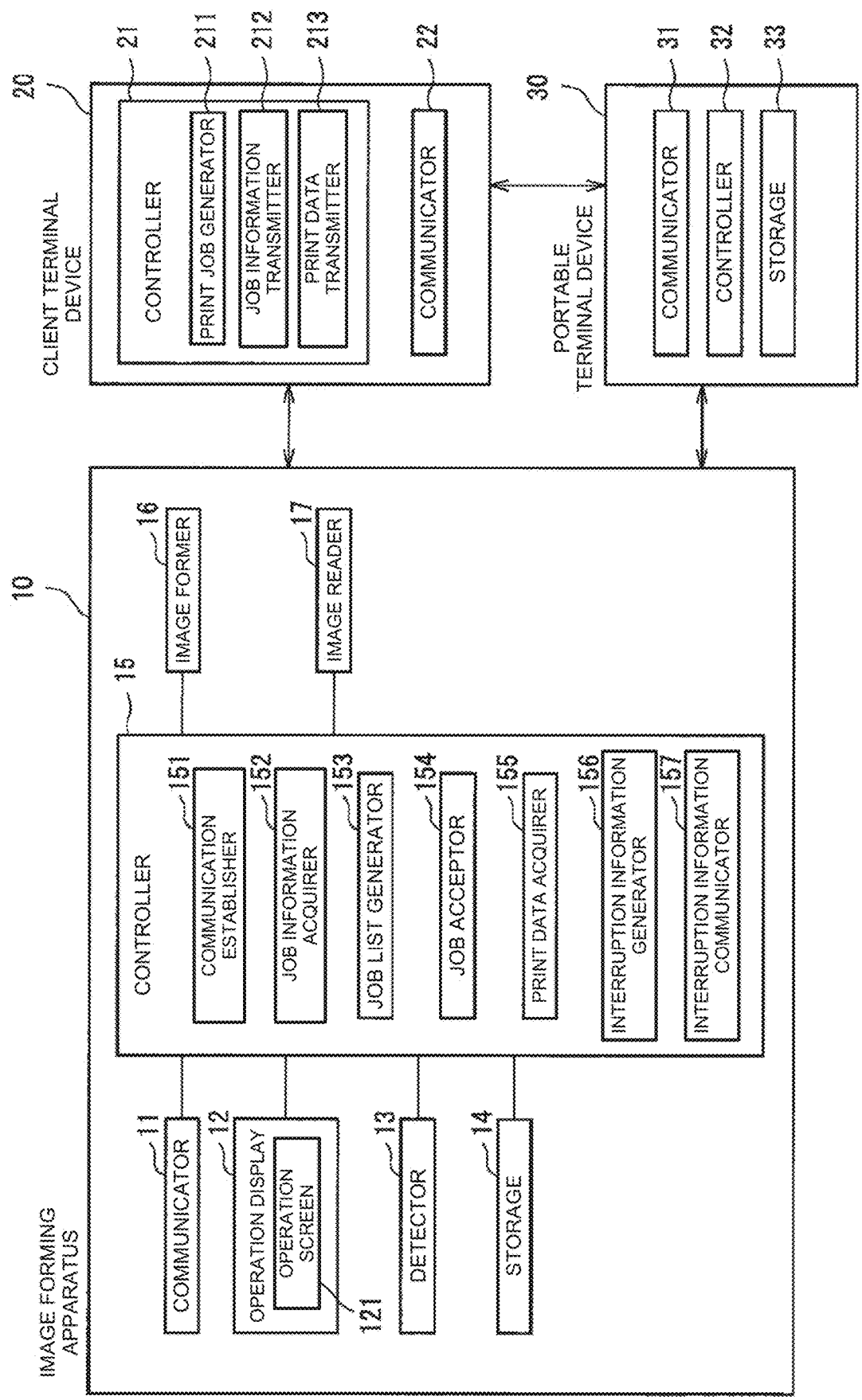
FIG. 2 is a block diagram illustrating structures of an image forming apparatus, a portable terminal device, and a client terminal device in the printing system and the control method of the printing system according to the embodiment of the present disclosure.

FIG. 2 is a block diagram illustrating the structure of the image forming apparatus 10, the client terminal device 20, and the portable terminal device 30 in the printing system 1 and a control method thereof according to the present embodiment. The image forming apparatus 10 includes a communicator 11, an operation display 12, a detector 13, a storage 14, a controller 15, an image former 16, and an image reader 17.

The communicator 11 of the image forming apparatus 10 includes a communication means that performs wired or wireless bidirectional communication processing through a network. For example, the communicator 11 can communicate with one portable terminal device 30 in ad-hoc mode or the like, but is not able to communicate with a plurality of portable terminal devices 30 simultaneously. The communicator 11 may also have an access point function, that is, a parent machine function in the wireless LAN, and may enable communication by connecting a wireless communication device having such an access point function to an interface such as USB which is not illustrated. Methods and specifications for the near-field communication to be implemented are not particularly limited, and Bluetooth (registered trademark), for example, may be used to implement the near-field communication.

The operation display 12 displays an operation screen 121 that allows input operations using a touch panel and a liquid crystal display (LCD). The operation display 12 may consist of the operation screen 121 and a plurality of physical buttons which are not illustrated. An NFC tag may be provided on the operation display 12 to perform near-field communication with external devices.

The detector 13 detects the portable terminal device 30 located near the image forming apparatus 10 and existing in an effective area 100. The communicator 11 implements the near-field communication with the detected portable terminal device 30. The controller 15 can transmit and receive various types of data via the near-field communication with the portable terminal device 30 through the communicator 11.

The storage 14 includes a hard disk drive (HDD), a solid state drive (SSD), or the like. The storage 14 can also store print data received via the communicator 11, print data read by the image reader 17, or the like.

The image reader 17 reads a document placed on the document stand or transported from a document tray and generates print data. The image former 16 includes a printer unit to generate images by generating toner images in accordance with the print data that is generated by the image reader 17, acquired from external sources, or the like, and transferring the toner images to paper or other media used for recording.

The client terminal device 20 generates a print job including job information and print data by the input operation in which the user sets print conditions and instructs execution of printing. The client terminal device 20 includes, for example, a communicator 22 and a controller 21 that controls operations of various components. The generated print job is stored in a storage not illustrated and can be held in the client terminal device 20.

The controller 21 includes a print job generator 211 that generates the print job, a job information transmitter 212 that transmits job information included in the print job generated by the print job generator 211, and a print data transmitter 213 that transmits print data included in the print job. The communicator 22 transmits and receives various types of data such as job information and print data of the print job generated by the print job generator 211.

The job information of the print job includes information necessary for image output, such as a job name, a number of copies specified in the print job, a paper size, color/monochrome designation, a paper type of paper to be used, and tray designation to which the paper is discharged. The print data is data (print data) generated in the form of image data subjected to image output by the image forming apparatus 10.

The client terminal device 20 transmits the job information to the portable terminal device 30 or transmits (outputs) the print data to one of the plurality of image forming apparatuses 10 in response to the input operation by the user. The print data output from the client terminal device 20 is held in the image forming apparatus 10 that outputs the print data.

The portable terminal device 30 includes, for example, a communicator 31, a controller 32, and a storage 33. The communicator 31 implements a wireless communication function including near-field communication, and is capable of communicating with the communicator 11, for example, of the image forming apparatus 10, in accordance with instructions from the controller 32, to transmit and receive various types of data to and from the image forming apparatus 10. The storage 33 includes, for example, a read-only memory (ROM) or a random access memory (RAM) to store various control programs and external transmitting/receiving data or the like that are transmitted and received to and from the outside via the communicator 31. The job information transmitted from the client terminal device 20 can also be stored in the storage 33. The storage 33 includes a nonvolatile memory to store various types of data. The controller 32 uses a central processing unit (CPU) to control various components in accordance with a control program stored in a ROM.

The communicator 31 of the portable terminal device 30, the communicator 22 of the client terminal device 20, and the communicator 11 of the image forming apparatus 10 can communicate via the near-field communication. Methods and specifications of the near-field communication implemented by the communicator 31 are not particularly limited, and Bluetooth (registered trademark), for example, may be used to implement the near-field communication.

The image forming apparatus 10 is capable of mutually communicating with such portable terminal device 30 and client terminal device 20 and, by using the CPU, the controller 15 controls various components illustrated in FIG. 2, such as a communication establisher 151, a job information acquirer 152, a job list generator 153, a job acceptor 154, a print data acquirer 155, an interruption information generator 156, an interruption information communicator 157, and the like, in accordance with the control program stored in the built-in ROM or the like, and processes the print job.

In the printing system 1 according to the present embodiment, the portable terminal device 30 is communicable via the near-field communication with the plurality of image forming apparatuses 10 (10A, 10B, 10C . . . ). One of these plurality of image forming apparatuses 10 (for example, the image forming apparatus 10A) acquires, when having detected the presence of the portable terminal device 30 in the effective area 100 and established the near-field communication therewith, the print data corresponding to the job information from the client terminal device 20 in accordance with the job information acquired from the storage 33 of the portable terminal device 30. The image forming apparatus 10 (10A) that has established the near-field communication with the portable terminal device 30 executes the image output of the print data acquired from the client terminal device 20.

In the controller 15, the communication establisher 151 establishes the near-field communication with the portable terminal device 30. The job information acquirer 152 acquires one or more job information stored in the storage 33 of the portable terminal device 30 through the near-field communication with the portable terminal device 30. The job list generator 153 generates a job list in accordance with the acquired job information.

The job acceptor 154 displays the generated job list on the operation screen 121 in a selectable manner, and accepts the selection operation of the job information by the user from the job list. When the job acceptor 154 accepts the job information by the selection operation by the user, the print data acquirer 155 acquires the print data corresponding to the selected job information from the client terminal device 20. The image former 16 forms images in accordance with the print data acquired by the print data acquirer 155, and executes image output of the print data.

In a case of interruption of the image output in the image former 16, the interruption information generator 156 provided in the controller 15 generates interruption information pertaining to the interrupted image output. The interruption information communicator 157 transmits the generated interruption information.

Example 1

Figure 3:
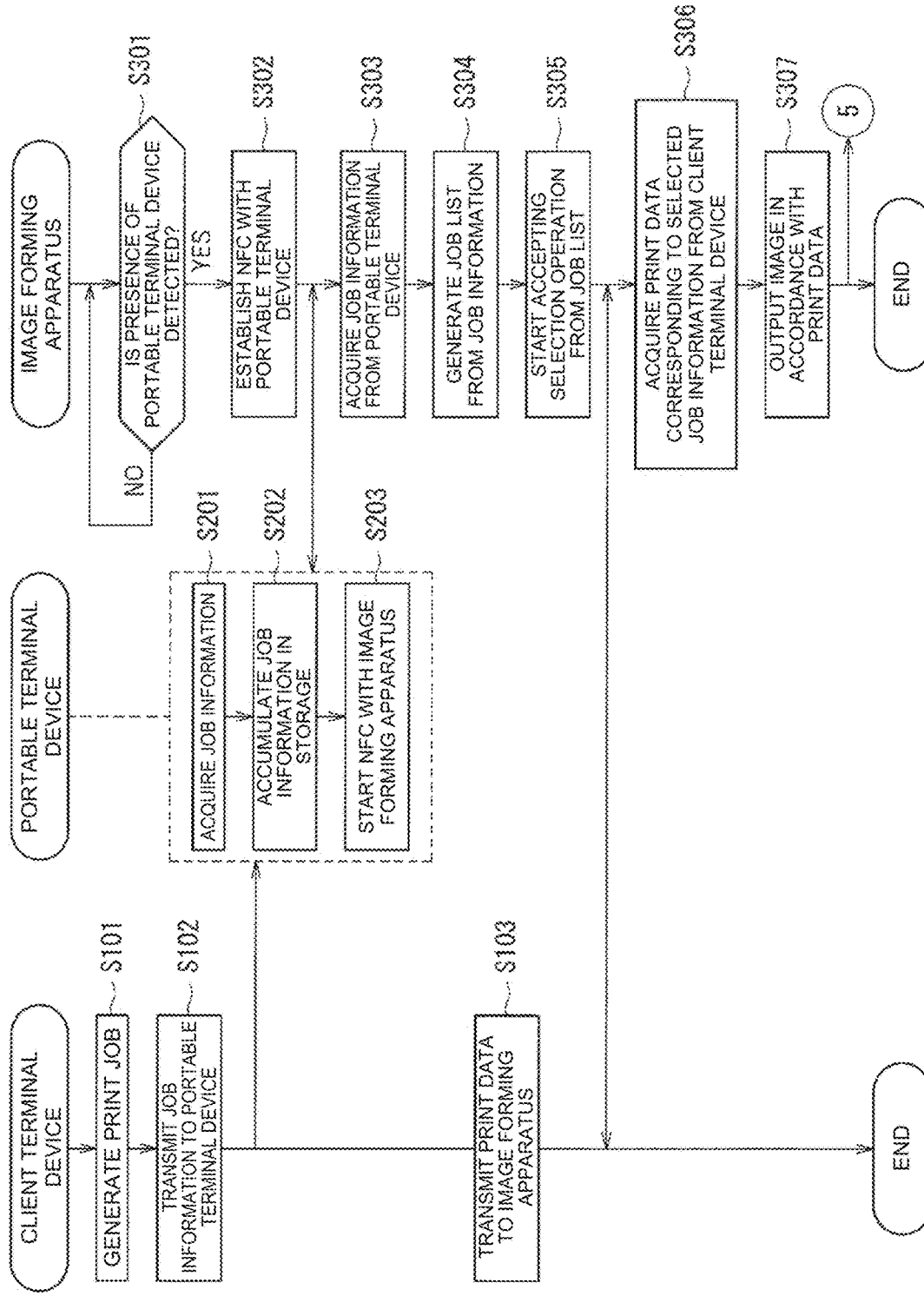
FIG. 3 is a sequence chart illustrating an example of an overall process flow of the printing system and the control method of the printing system according to the embodiment of the present disclosure.

FIG. 3 is a sequence chart illustrating an example of an overall process flow of the printing system 1 and a control method thereof according to the present embodiment.

Referring to FIGS. 2 and 3, the client terminal device 20 generates a print job including job information and print data at the print job generator 211 in response to the user operation (step S101). The job information transmitter 212 transmits the job information in the generated print job to the portable terminal device 30 of the user (step S102).

The portable terminal device 30 acquires the job information from the client terminal device 20 (step S201). The storage 33 accumulates the acquired job information (step S202). The user carrying the portable terminal device 30 moves to the vicinity of an appropriate image forming apparatus 10 of the plurality of the image forming apparatuses 10 on which the user wants to have the print job executed.

The image forming apparatus 10 determines whether the detector 13 has detected the presence of the portable terminal device 30 in the effective area 100 (step S301). If it is determined that no presence of the portable terminal device 30 is detected (NO in step S301), the process returns to step S301 and waits until it is determined that the presence of the portable terminal device 30 is detected.

When the user carrying the portable terminal device 30 approaches the image forming apparatus 10, or when the user holds the portable terminal device 30 over the detector 13, the detector 13 detects the presence of the portable terminal device 30 (in step S301 YES). The communication establisher 151 of the controller 15 starts the operation to establish communication with the portable terminal device 30 and establishes the near-field communication (step S302).

The image forming apparatus 10, having established the near-field communication with the portable terminal device 30, acquires one or more job information stored in the storage 33 of the portable terminal device 30 by the job information acquirer 152 (step S303). The job list generator 153 generates a job list in accordance with the job information acquired from the portable terminal device 30 (step S304).

Figure 4:
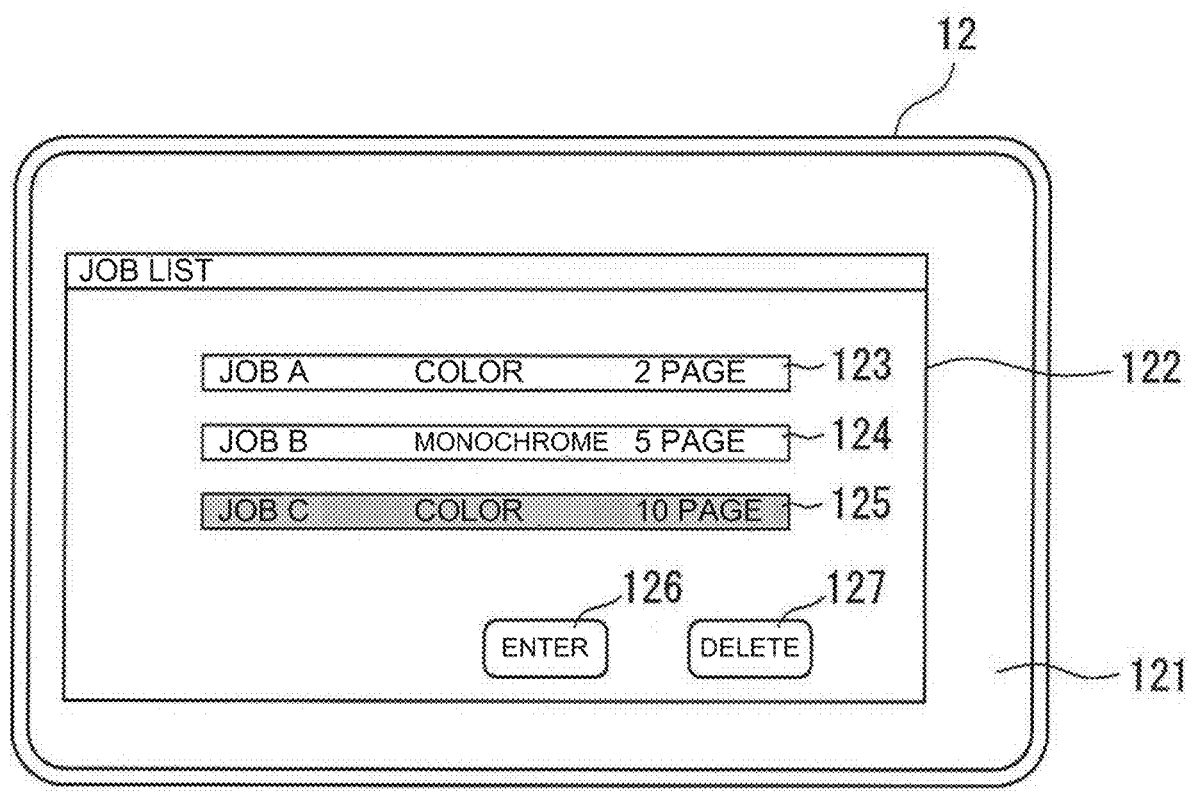
FIG. 4 is an explanatory view illustrating an example of display of a job list on an operation screen of the image forming apparatus.

FIG. 4 is an explanatory view illustrating a display example of the job list 122 on the operation screen 121. The job acceptor 154 displays the job list 122 generated by the job list generator 153 on the operation screen 121 of the operation display 12 in a selectable manner, and starts accepting a selection operation from the job list 122 (step S305). If the job information acquirer 152 has acquired one job information, the job list 122 illustrates one job information. If more than one job information is acquired, more than one job information (for example, a plurality of job names) are listed in the job list 122.

For example, as illustrated in FIG. 4, in accordance with three job information acquired, the job list 122 including three job information: "Job A" 123, "Job B" 124, and "Job C" 125, is displayed along with color/monochrome designation, number of pages, and the like in a selectable manner. The job list 122 on the operation screen 121 also displays input operation acceptors such as an "Enter" ("Print") 126 and a "Delete" (or a "Cancel") 127. On the operation display 12 displayed as such, the user can select the job information by selecting the job name (for example, Job C) to be executed from the indicated job list 122, followed by selecting and operating the "Enter" ("Print") 126.

When the job acceptor 154 accepts the job information selected by the user, the print data acquirer 155 starts acquiring the print data corresponding to the selected job information from the client terminal device 20. The client terminal device 20 receives a request for transmission of the print data from the image forming apparatus 10, reads the print data from the storage not illustrated, and transmits the print data to the image forming apparatus 10 (step S103). The image forming apparatus 10 acquires the print data from the client terminal device 20 (step S306) and executes image output in accordance with the acquired print data and job information (step S307).

Thus, the user can execute a desired print job in the image forming apparatus 10 by a very simple operation, that is, approaching to the image forming apparatus 10 by carrying the portable terminal device 30, and performing the input operation on the job list 122 displayed on the operation screen 121. During this time, the user does not need to operate the portable terminal device 30. The portable terminal device 30 receives the job information included in the print job, but does not receive the print data, and the print data is transmitted to the image forming apparatus 10, instead of the portable terminal device 30, from the client terminal device 20, thus preventing the strain on the data capacity of the portable terminal device 30 and reducing the communication load.

Example 2

FIG. 5 is a sequence chart illustrating an example of an process flow when the image output started by the image forming apparatus 10 is interrupted in the printing system 1 and a control method thereof according to the present embodiment.

In the printing system 1 according to the present embodiment, it is assumed that one of the plurality of image forming apparatuses 10 (for example, 10A to 10C) starts the image output in accordance with the print data acquired from the client terminal device 20 (step S307 in FIG. 3), and some cause occurs after that to interrupt the image output (circled number 5), so that the image output is interrupted (step S401 in FIG. 5). Examples of the cause of interruption include running out of paper, running out of toner, or malfunctions. Here, assume that the image forming apparatus 10 in which the image output is interrupted is denoted as a first image forming apparatus 10A and the subsequent process flow is described below.

Referring to FIGS. 2 and 5, the first image forming apparatus 10A generates interruption information pertaining to the interrupted image output at the interruption information generator 156 (step S402). The interruption information includes job information corresponding to the print data that is being output. In other words, the interruption information including the job information acquired in step S303 in FIG. 3 is generated. The interruption information also includes information on the status of the image output, such as the number of pages of interrupted image output (number of pages in process or unprocessed pages). Once the interruption information is generated by the interruption information generator 156, the interruption information communicator 157 transmits the generated interruption information to the portable terminal device 30 (step S403).

The portable terminal device 30 acquires the interruption information from the first image forming apparatus 10A via the near-field communication (step S501). The storage 33 of the portable terminal device 30 accumulates the acquired interruption information (step S502). Upon receiving the interruption of the image output at the first image forming apparatus 10A, the user takes the portable terminal device 30 and leaves the first image forming apparatus 10A for another image forming apparatus (for example, the second image forming apparatus 10B) capable of outputting images.

In the second image forming apparatus 10B, the detector 13 determines whether the presence of the portable terminal device 30 in the effective area 100 is detected (step S601). If it is determined that no presence of the portable terminal device 30 is detected (NO in step S601), the process returns to step S601 and waits until it is determined that the presence of the portable terminal device 30 is detected. When the user carrying the portable terminal device 30 approaches the second image forming apparatus 10B, or when the user holds the portable terminal device 30 over the detector 13 of the second image forming apparatus 10B, the detector 13 detects the presence of the portable terminal device 30 (YES in step S601), and the communication establisher 151 of the second image forming apparatus 10B establishes the near-field communication with the portable terminal device 30 (step S602).

In the second image forming apparatus 10B, the job information acquirer 152 acquires interruption information including job information from the portable terminal device 30 (step S603). The job list generator 153 generates a job list in accordance with the job information included in the interruption information (step S604). The job acceptor 154 displays the job list 122 generated by the job list generator 153 on the operation screen 121 of the operation display 12 in a selectable manner, and accepts the selection operation of the job list 122 (step S605).

On the operation display 12 of the second image forming apparatus 10B, the user can select and operate the job information to be continued from the job list 122 displayed on the operation screen 121. When the job acceptor 154 accepts the selection operation by the user, the print data acquirer 155 starts to acquire the print data corresponding to the selected job information (step S606).

At this time, the second image forming apparatus 10B may acquire the corresponding print data from the client terminal device 20 or from the first image forming apparatus 10A in accordance with the job information selected from the job list 122. For example, the client terminal device 20 can receive a transmission request from the print data acquirer 155 of the second image forming apparatus 10B, read the relevant print data, and transmit it to the second image forming apparatus 10B through the communicator 22. If the cause of the interruption occurs during the state in which the first image forming apparatus 10A is communicable, it is possible to read the print data stored in the storage 14 of the first image forming apparatus 10A and, in response to the transmission request from the print data acquirer 155, transmit the print data from the first image forming apparatus 10A to the second image forming apparatus 10B.

The second image forming apparatus 10B that has acquired the print data refers to the interruption information acquired from the portable terminal device 30 and continues the interrupted image output in the image former 16 (step S607).

This allows the user to immediately execute the rest of the image output on the second image forming apparatus 10B even when the interruption of the image output occurs on the first image forming apparatus 10A. Thus, the user carrying the portable terminal device 30 can complete the execution of the desired print job simply by moving to the second image forming apparatus 10B and performing the operation input on the job list 122 displayed on the operation screen 121. During this time, the user does not need to operate the portable terminal device 30 nor transmit and receive the print data on the portable terminal device 30, thus preventing the strain on the data capacity of the portable terminal device 30 and reducing the communication load.

While there is a possible usage form in which, for example, the image forming apparatus 10 having the largest storage capacity is set as the parent machine in advance and other image forming apparatuses 10 are used as child machines among the plurality of the image forming apparatuses 10 (10A, 10B, 10C . . . ) connected to a network, the printing system 1 as described in the above embodiment can equalize the storage capacity among the plurality of the image forming apparatuses 10 and distribute the frequency of use of the users, thus eliminating the need for the parent/child settings.

Although each of the above embodiments has been described using an example of a multifunction peripheral including the image reader 17 as the image forming apparatus 10, the same can be implemented even when the image forming apparatus does not include the image reader 17.

The present disclosure is not limited to the embodiments described above, but can be executed in various other forms. Therefore, the above embodiments are in all respects merely illustrative and should not be construed as limiting. The scope of the present disclosure is indicated by the appended claims, and is not bound in any way by the text of the specification. Further, all variations and modifications that fall within the equivalent scope of the appended claims are within the scope of the present disclosure.

What is claimed is:

1. A printing system, comprising:
a portable terminal device;
a client terminal device; and
at least one image forming apparatus capable of mutually communicating with the portable terminal device and the client terminal device, the at least one image forming apparatus processing a print job, wherein
the print job includes at least one job information and print data,
the portable terminal device includes
a communicator capable of communicating wirelessly with the client terminal device and the at least one image forming apparatus, and
a storage that stores the at least one job information transmitted from the client terminal device,
the at least one image forming apparatus includes:
a print data acquirer that acquires the print data corresponding to the at least one job information from the client terminal device in accordance with the at least one job information acquired from the portable terminal device, and executes image output of the print data,
an operation display that displays an operation screen on which an input operation is allowed,
a detector that detects a presence of the portable terminal device in an effective area of near-field communication,
a communication establisher that establishes the near-field communication with the portable terminal device,
a job information acquirer that acquires the at least one job information stored in the storage of the portable terminal device,
a job list generator that generates a job list in accordance with the acquired at least one job information,
a job acceptor that displays the job list on the operation screen in a selectable manner and accepts a selection operation of the at least one job information from the job list,
an interruption information generator that generates, when the image output that has been started is interrupted, interruption information including the job information corresponding to the print data pertaining to the interrupted image output, and
an interruption information communicator that transmits the interruption information, wherein
the print data corresponding to the selected at least one job information is acquired from the client terminal device by the print data acquirer when the job acceptor accepts the selection operation of the at least one job information, and
the at least one image forming apparatus executes the image output in accordance with the acquired print data, wherein
the at least one image forming apparatus comprises a plurality of image forming apparatuses,
the portable terminal device is capable of performing near-field communication with the plurality of image forming apparatuses, one image forming apparatus of the plurality of the image forming apparatuses that has established the near-field communication with the portable terminal device executes the image output of the print data, a first image forming apparatus of the plurality of image forming apparatuses transmits the interruption information generated by the interruption information generator to the portable terminal device when the image output that has been started is interrupted at the first image forming apparatus, and a second image forming apparatus of the plurality of image forming apparatuses acquires, when the second image forming apparatus detects the presence of the portable terminal device in the effective area of near-field communication, the interruption information from the storage of the portable terminal device, generates the job list in accordance with the at least one job information included in the interruption information, and continues the image output that has been interrupted in accordance with the at least one job information selected from the job list.

2. The printing system according to claim 1, wherein the second image forming apparatus acquires the print data corresponding to the at least one job information from the client terminal device in accordance with the at least one job information selected from the job list, and continues the image output.

3. The printing system according to claim 1, wherein the second image forming apparatus acquires the print data corresponding to the at least one job information from the first image forming apparatus in accordance with the at least one job information selected from the job list, and continues the image output.

4. A control method of a printing system that includes a portable terminal device, a client terminal device, and a plurality of image forming apparatuses capable of communicating with the portable terminal device and the client terminal device, wherein:

a first image forming apparatus in the plurality of image forming apparatuses processes a print job, the print job includes at least one job information and print data, and the portable terminal device includes a communicator capable of wirelessly communicating with the client terminal device and the image forming apparatus, and a storage that stores the at least one job information transmitted from the client terminal device, the control method comprising:
causing the first image forming apparatus to:
acquire the print data corresponding to the at least one job information from the client terminal device in accordance with the at least one job information acquired from the portable terminal device, execute image output of the print data, display, on a display, an operation screen on which an input operation is allowed, detect a presence of the portable terminal device in an effective area of near-field communication, establish the near-field communication with the portable terminal device, acquire the at least one job information stored in the storage of the portable terminal device, generate a job list in accordance with the acquired at least one job information, display, on the display, the job list on the operation screen in a selectable manner and accept a selection operation of the at least one job information from the job list, generate, when the image output that has been started is interrupted, interruption information including the job information corresponding to the print data pertaining to the interrupted image output, and transmit the interruption information, wherein the print data corresponding to the selected at least one job information is acquired from the client terminal device when accepting the selection operation of the at least one job information, and the image output is executed in accordance with the acquired print data, wherein the portable terminal device is capable of performing near-field communication with the plurality of image forming apparatuses, the first image forming apparatus of the plurality of the image forming apparatuses that has established the near-field communication with the portable terminal device executes the image output of the print data, a second image forming apparatus of the plurality of image forming apparatuses transmits the interruption information generated by the interruption information generator to the portable terminal device when the image output that has been started is interrupted at the second image forming apparatus, and a third image forming apparatus of the plurality of image forming apparatuses acquires, when the third image forming apparatus detects the presence of the portable terminal device in the effective area of the near-field communication, the interruption information from the storage of the portable terminal device, generates the job list in accordance with the at least one job information included in the interruption information, and continues the image output that has been interrupted in accordance with the at least one job information selected from the job list.

* * * * *